United States Patent
Kinsler

(12) 
(10) Patent No.: US 10,723,299 B2
(45) Date of Patent: Jul. 28, 2020

(54) VEHICLE BODY COMPONENTS COMPRISING RETROREFLECTORS AND THEIR METHODS OF MANUFACTURE

(71) Applicant: SRG Global Inc., Troy, MI (US)

(72) Inventor: Johanna Krueger Kinsler, Royal Oak, MI (US)

(73) Assignee: SRG Global Inc., Troy, MI (US)

(*) Notice: Subject to any disclaimer, the term of this patent is extended or adjusted under 35 U.S.C. 154(b) by 0 days.

(21) Appl. No.: 15/899,745

(22) Filed: Feb. 20, 2018

(65) Prior Publication Data
US 2018/0334124 A1   Nov. 22, 2018

Related U.S. Application Data

(63) Continuation-in-part of application No. 15/598,830, filed on May 18, 2017.

(51) Int. Cl.
*B60R 21/0132* (2006.01)
*G01S 7/02* (2006.01)
(Continued)

(52) U.S. Cl.
CPC ........ *B60R 21/01332* (2014.12); *B60R 13/00* (2013.01); *B60R 13/005* (2013.01);
(Continued)

(58) Field of Classification Search
CPC .......... H01Q 15/14; H01Q 15/18; H01Q 3/46; B32B 15/04; B32B 2307/202; B32B 2307/41; B32B 2605/00; G02B 5/128; G02B 5/124; G02B 5/0816; B62D 25/00; G01S 13/931

See application file for complete search history.

(56) References Cited

U.S. PATENT DOCUMENTS 2,452,822 A   11/1948   Wolf
2,872,675 A    2/1959   Kennaugh
(Continued)

FOREIGN PATENT DOCUMENTS

CA   1074910 A   4/1980
CN   106716285 A   5/2017
(Continued)

OTHER PUBLICATIONS

International Search Report and Written Opinion dated Jul. 23, 2018 for International Application No. PCT/IB2018/053119, 12 pages.
(Continued)

*Primary Examiner* — Peter M Bythrow

(57) ABSTRACT

A body component of a vehicle can comprise a first substrate formed of at least one non-conductive material and defining a back surface that defines a retroreflector geometry and a front surface that defines a different geometry than the retroreflector geometry, wherein the front surface of the first substrate is an exposed A-surface of the body component. The body component can further comprise a conductive layer formed of a conductive material and arranged adjacent to the back surface of the first layer, the conductive layer (i) also defining the retroreflector geometry and (ii) reflecting radar waves transmitted from a radar device of another vehicle.

20 Claims, 11 Drawing Sheets

(51) Int. Cl.
*G01S 7/41* (2006.01)
*H01Q 15/14* (2006.01)
*B60R 13/00* (2006.01)
*B60R 13/04* (2006.01)
*H01Q 15/18* (2006.01)
*H01Q 1/32* (2006.01)
*G01S 7/40* (2006.01)
*B60R 13/01* (2006.01)
*G01S 13/931* (2020.01)

(52) U.S. Cl.
CPC .............. *B60R 13/04* (2013.01); *G01S 7/024* (2013.01); *G01S 7/411* (2013.01); *H01Q 1/3283* (2013.01); *H01Q 15/144* (2013.01); *H01Q 15/18* (2013.01); *B60R 2013/016* (2013.01); *G01S 2007/4091* (2013.01); *G01S 2013/9329* (2020.01)

(56) References Cited

U.S. PATENT DOCUMENTS

| | | | | |
|---|---|---|---|---|
| 3,541,606 | A * | 11/1970 | Heenan | G02B 5/124 359/533 |
| 3,712,706 | A * | 1/1973 | Stamm | G02B 5/124 359/531 |
| 3,737,904 | A * | 6/1973 | Mori | H01Q 15/22 342/5 |
| 3,894,790 | A * | 7/1975 | Golden | B62J 6/20 359/523 |
| 3,905,680 | A | 9/1975 | Nagel | |
| D245,403 | S * | 8/1977 | Kagayama | D10/111 |
| 4,149,304 | A | 4/1979 | Brynjegard | |
| 4,501,784 | A * | 2/1985 | Moshinsky | H01Q 15/14 244/117 R |
| 4,761,055 | A * | 8/1988 | Hatje | H01Q 15/0006 342/5 |
| 4,843,396 | A | 6/1989 | Macikunas et al. | |
| 4,983,021 | A | 1/1991 | Fergason | |
| 4,990,918 | A | 2/1991 | Michelson et al. | |
| 5,204,680 | A * | 4/1993 | Allington | H01O 15/0006 342/4 |
| 5,210,642 | A * | 5/1993 | Coligionis | B60Q 1/32 359/548 |
| 5,691,846 | A * | 11/1997 | Benson, Jr. | B29C 39/148 156/245 |
| 5,706,132 | A * | 1/1998 | Nestegard | G02B 5/124 359/529 |
| 5,714,947 | A | 2/1998 | Richardson et al. | |
| 5,819,164 | A | 10/1998 | Sun et al. | |
| 5,840,405 | A * | 11/1998 | Shusta | G02B 5/124 428/156 |
| 5,962,108 | A * | 10/1999 | Nestegard | B32B 38/0008 428/172 |
| 6,005,511 | A | 12/1999 | Young et al. | |
| 6,024,455 | A * | 2/2000 | O'Neill | G02B 5/124 359/530 |
| 6,045,230 | A | 4/2000 | Dreyer et al. | |
| 6,120,154 | A | 9/2000 | Ishizaka | |
| 6,157,486 | A * | 12/2000 | Benson, Jr. | G02B 5/124 359/487.05 |
| 6,567,039 | B2 | 5/2003 | Shirai et al. | |
| 6,677,028 | B1 * | 1/2004 | Lasch | B32B 27/40 359/529 |
| 6,738,007 | B1 * | 5/2004 | Stafford | B63G 13/02 342/3 |
| 7,152,983 | B2 * | 12/2006 | Smith | B29D 11/00605 359/529 |
| 7,196,654 | B2 | 3/2007 | Edwards et al. | |
| 7,365,703 | B2 | 4/2008 | Näsvall et al. | |
| 7,482,969 | B2 | 1/2009 | Huff et al. | |
| 7,506,987 | B2 * | 3/2009 | Nilsen | G02B 5/124 359/529 |
| 7,562,991 | B2 * | 7/2009 | Benson | G02B 5/124 359/530 |
| 7,842,374 | B2 * | 11/2010 | Bacon, Jr. | B32B 3/30 428/156 |
| 8,134,521 | B2 * | 3/2012 | Herz | H01Q 15/14 343/700 MS |
| 8,164,455 | B2 | 4/2012 | Fukuda | |
| 8,177,374 | B2 * | 5/2012 | Wu | B29D 11/00605 359/530 |
| 8,620,120 | B2 | 12/2013 | Baets et al. | |
| 8,730,014 | B2 | 5/2014 | Fullerton | |
| 8,746,902 | B2 * | 6/2014 | Patel | B32B 27/08 359/529 |
| 9,291,752 | B2 * | 3/2016 | Coggio | G02B 5/124 |
| 9,335,405 | B2 | 5/2016 | Durand et al. | |
| 9,366,789 | B2 * | 6/2016 | Thakkar | G02B 5/124 |
| 9,372,288 | B2 * | 6/2016 | Mimura | G02B 5/124 |
| 9,618,663 | B2 * | 4/2017 | Smith | G02B 5/124 |
| 9,772,431 | B2 * | 9/2017 | Millar | G02B 5/124 |
| 2003/0143378 | A1 * | 7/2003 | Benson | B29O 33/3842 428/167 |
| 2005/0219146 | A1 * | 10/2005 | Judasz | H01O 19/195 343/912 |
| 2007/0071932 | A1 * | 3/2007 | Huang | G02B 5/124 428/40.1 |
| 2008/0212182 | A1 * | 9/2008 | Nilsen | G02B 5/124 359/530 |
| 2008/0284568 | A1 | 11/2008 | Kumar | |
| 2010/0124632 | A1 * | 5/2010 | Hannington | B32B 3/08 428/142 |
| 2011/0128625 | A1 * | 6/2011 | Larsen | B82Y 20/00 359/530 |
| 2012/0038984 | A1 * | 2/2012 | Patel | G02B 5/124 359/530 |
| 2013/0114143 | A1 * | 5/2013 | Thakkar | G02B 5/124 359/530 |
| 2013/0162462 | A1 | 6/2013 | Lehning | |
| 2013/0185847 | A1 * | 7/2013 | Steenson | H01Q 15/18 2/243.1 |
| 2014/0240102 | A1 | 8/2014 | Kawash et al. | |
| 2015/0029050 | A1 * | 1/2015 | Driscoll | H01Q 15/14 342/5 |
| 2015/0049384 | A1 * | 2/2015 | Coggio | G02B 5/124 359/530 |
| 2015/0102154 | A1 | 4/2015 | Duncan et al. | |
| 2015/0130651 | A1 | 5/2015 | Mogridge et al. | |
| 2015/0145711 | A1 * | 5/2015 | Maddox | G01S 13/931 342/27 |
| 2015/0145713 | A1 | 5/2015 | Maddox et al. | |
| 2015/0303581 | A1 | 10/2015 | Bodo | |
| 2016/0084944 | A1 | 3/2016 | Bialer et al. | |
| 2016/0103256 | A1 * | 4/2016 | Millar | G02B 5/124 235/468 |
| 2016/0370805 | A1 | 12/2016 | Mazur et al. | |

FOREIGN PATENT DOCUMENTS

| | | |
|---|---|---|
| DE | 102006026950 A1 | 1/2007 |
| DE | 102009021851 A1 | 12/2009 |
| DE | 102009035521 A1 | 2/2011 |
| EP | 2712373 A1 | 4/2014 |
| GB | 2369248 A | 5/2002 |
| JP | 3433776 B2 | 12/1994 |
| JP | H10293175 A | 11/1998 |
| JP | 2000103283 A | 4/2000 |
| JP | 2000330630 A | 11/2000 |
| JP | 2001033550 A | 2/2001 |
| JP | 2008170173 A | 7/2008 |
| JP | 4450835 B2 | 4/2010 |
| JP | 2013175800 A | 9/2013 |
| KR | 20110105055 A | 9/2011 |
| KR | 101080730 B1 | 11/2011 |
| KR | 20130124116 A | 11/2013 |
| KR | 20150026655 A | 3/2015 |
| WO | 2012154117 A1 | 11/2012 |
| WO | 2015172770 A1 | 11/2015 |

(56) References Cited

FOREIGN PATENT DOCUMENTS

| | | |
|---|---|---|
| WO | 2015179682 A1 | 11/2015 |
| WO | 2015179685 A1 | 11/2015 |
| WO | 2018057657 A2 | 3/2018 |

OTHER PUBLICATIONS

International Search Report and Written Opinion dated Oct. 25, 2019 for International Application No. PCT/IB2019/051346, 13 pages.

"Van Atta Array Reflector", Chung et al. Encyclopedia of RF and Microwave Engineering, Apr. 15, 2005, pp. 1-38, retrieved Apr. 10, 2019 from https://onlinelibrary.wiley.com/doi/abs/10.1002/0471654507. eme528 (Year: 2005).

* cited by examiner

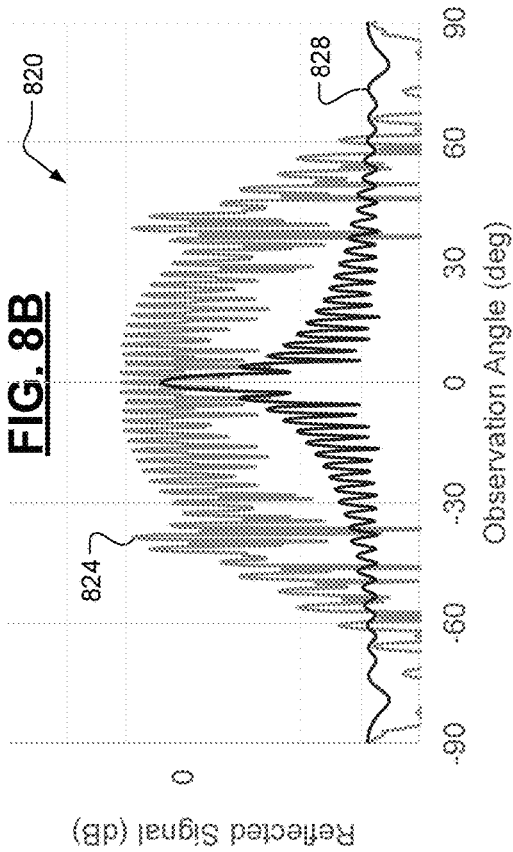
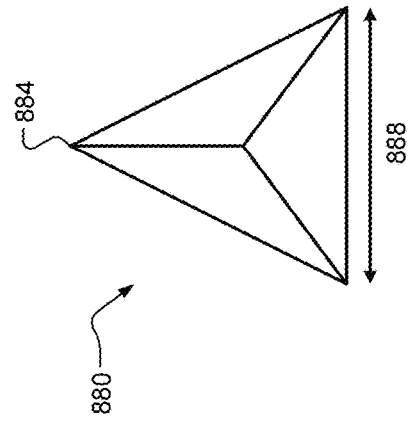
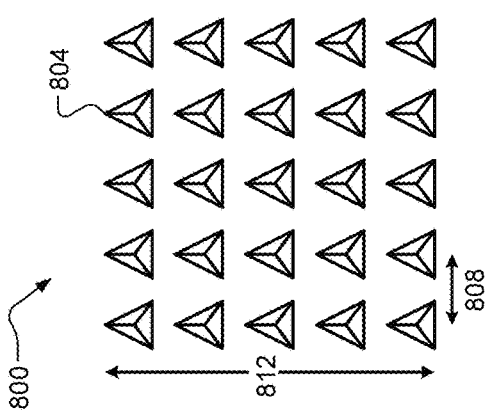
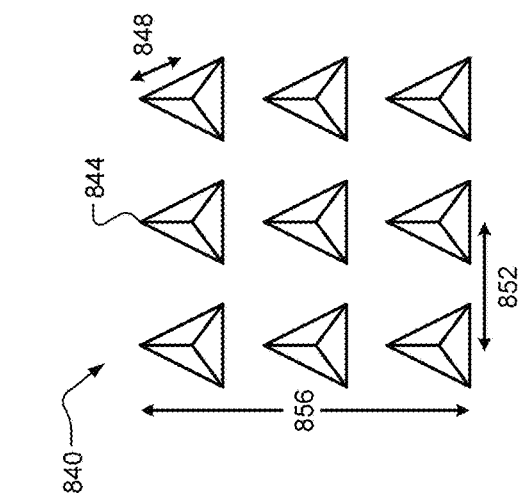

VEHICLE BODY COMPONENTS COMPRISING RETROREFLECTORS AND THEIR METHODS OF MANUFACTURE

RELATED APPLICATIONS

This application is a continuation-in-part of U.S. patent application Ser. No. 15/598,830 filed on May 18, 2017. The disclosure of the above application is incorporated herein by reference in its entirety.

FIELD

The present application generally relates to vehicle object detection systems and, more particularly, to vehicle body components comprising retroreflectors and their methods of manufacture.

BACKGROUND

Vehicles can include radar-based object detection systems configured to detect objects based on reflected radar waves. One major challenge for these systems is to detect relevant or important objects (e.g., other vehicles) while ignoring irrelevant or unimportant ones (e.g., noise). Accordingly, while such systems work for their intended purpose, there remains a need for improvement in the relevant art.

SUMMARY

According to one aspect of the present disclosure, a body component of a vehicle is presented. In one exemplary implementation, the body component comprises a first substrate formed of at least one non-conductive material and defining a back surface that defines a retroreflector geometry and a front surface that defines a different geometry than the retroreflector geometry, wherein the front surface of the first substrate is an exposed A-surface of the body component, and a conductive layer formed of a conductive material and arranged adjacent to the back surface of the first layer, the conductive layer (i) also defining the retroreflector geometry and (ii) reflecting radar waves transmitted from a radar device of another vehicle.

In some implementations, an exposed surface of the conductive layer is an exposed B-surface of the body component. In some implementations, the first substrate and the conductive layer collectively form a solid body. In some implementations, the first substrate comprises both a substrate layer and a top coat layer each formed of one of the at least one non-conductive material. In some implementations, at least one of the substrate layer and the top coat layer are opaque.

In some implementations, the body component further comprises a second substrate arranged adjacent to the conductive layer and defining an exposed back surface that is an exposed B-surface of the body component. In some implementations, the first and second substrates and the conductive layer collectively form a solid body. In some implementations, the first substrate comprises both a substrate layer and a top coat layer each formed of one of the at least one non-conductive material. In some implementations, at least one of the substrate layer and the top coat layer are opaque.

In some implementations, the retroreflector geometry comprises a plurality of retroreflector units. In some implementations, each retroreflector unit is a corner retroreflector defining a corner angle of approximately ninety degrees. In some implementations, edges of the each retroreflector unit are rounded to at least one of (i) prevent radar signal scattering and (ii) prevent strong peaks in signal interference. In some implementations, the conductive layer defines a curvature corresponding to a curvature of the body component.

According to another aspect of the present disclosure, another body component for a vehicle is presented. In one exemplary implementation, the body component comprises a first substrate formed of a first non-conductive material, a conductive layer comprising a plurality of retroreflector units each formed of a conductive material, the plurality of retroreflector units collectively forming a retroreflector array configured to reflect radar waves transmitted from a radar device of another vehicle, and at least one cover layer formed of at least a second non-conductive material and disposed on a front surface of the conductive layer.

In some implementations, the body component further comprises conductive traces connecting each retroreflector unit to another retroreflector unit. In some implementations, the retroreflector array further comprises one or more modulation devices disposed along one or more of the conductive traces and configured to modulate the reflected radar waves. In some implementations, the retroreflector array and the one or more modulation devices are configured to modulate the reflected radar waves to create a unique identifier that is recognizable to the other vehicle.

In some implementations, the conductive material is (i) a metal deposited by a metallic wet chemistry including one of chrome plating, metallic paint, and metallic spray, (ii) a metallic foil, or (iii) a metal applied through physical vapor deposition (PVD). In some implementations, each retroreflector unit is attached to a front surface of the first substrate or embedded therein. In some implementations, the retroreflector array comprises at least two rows and at least two columns of retroreflector units. In some implementations, the conductive layer defines a curvature corresponding to a curvature of the body component. In some implementations, the retroreflector array is configured as a Van Atta array.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 8A-8D depict example configurations of retroreflector pieces and a plot of example retroreflector performance according to some implementations of the present disclosure;

DETAILED DESCRIPTION

As previously mentioned, conventional vehicle radar-based object detection systems can have difficulty discerning between relevant or important objects (e.g., other vehicles) and irrelevant or unimportant objects (e.g., noise). Accordingly, vehicle body components comprising retroreflectors and their methods of manufacture are presented. The term "retroreflector" as used herein refers to a device or surface designed to reflect radar waves with decreased or minimal scattering. Retroreflectors are also commonly referred to as retroflectors and cataphotes. The retroreflectors are designed to improve or enhance the detectability of the vehicle by another vehicle's radar-based object detection system because they reflect more signal to its place of origin (reflected radar waves) compared to other reflective objects. In some embodiments, the retroreflectors can be incorporated into existing vehicle body components (grilles, side molding panels, bumpers, trunk lid finishers, etc.) such that they are hidden from view, thereby improving visual aesthetics. Various methods of manufacturing vehicle body components comprising these retroreflectors can be utilized, which are discussed in greater detail below.

Figure 1:
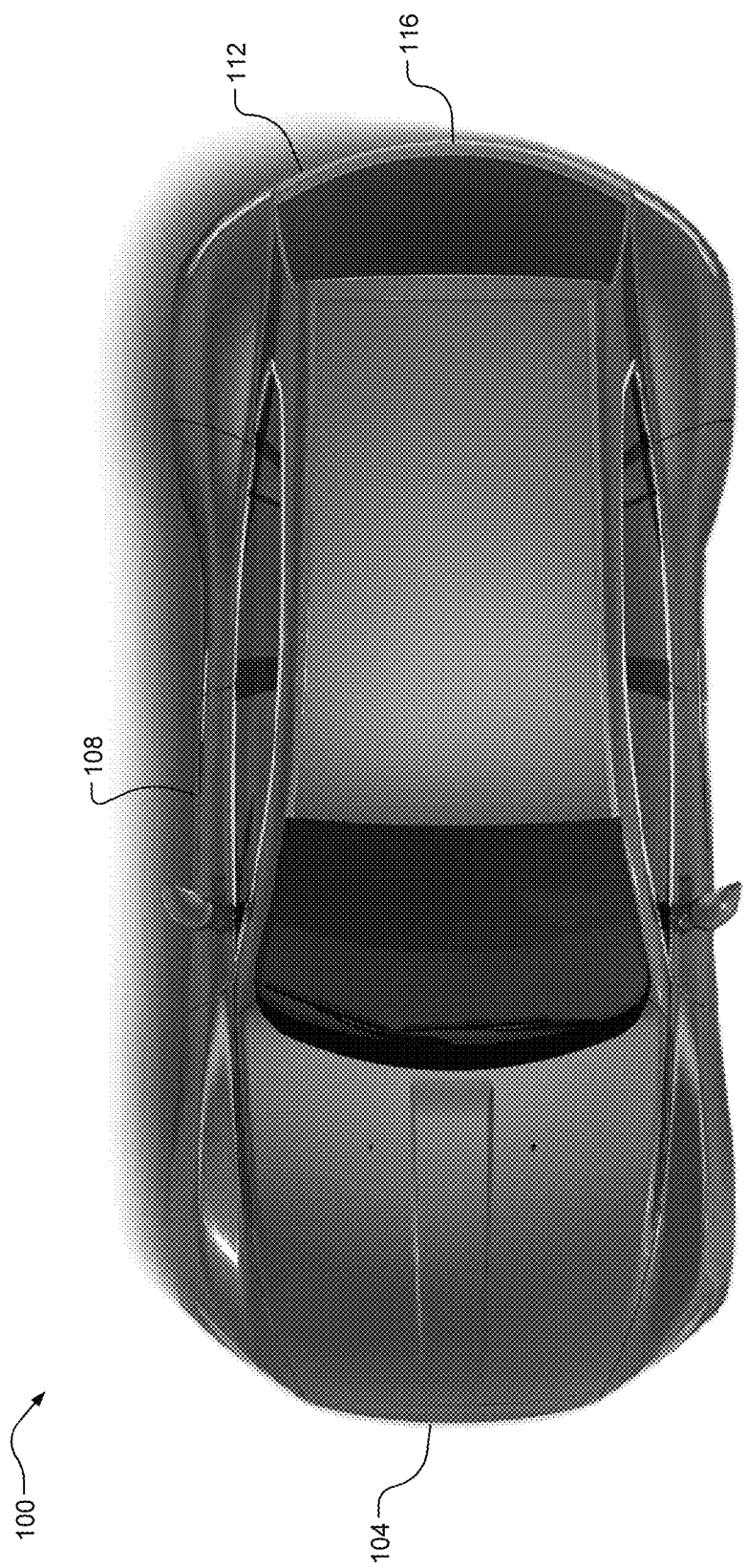
FIG. 1 depicts an overhead view of a vehicle and example body components in which to incorporate retroreflectors according to some implementations of the present disclosure.

Referring now to FIG. 1, an overhead view of an example vehicle 100 illustrates example body components in which retroreflectors can be implemented. The term "vehicle" as used herein refers to any human-driven or autonomous (self-driving) vehicle, including, but not limited to private and commercial passenger vehicles, such as cars (sedan, coupe, hatchback, convertible, etc.), sport utility vehicles (SUVs), trucks, freight/delivery/hauling vehicles, including articulated trailers, buses, as well as motorcycles, all-terrain vehicles (ATVs), and the like. One example body component in which the retroreflector assembly of the present disclosure could be implemented is a front grille 104. Another example body component in which the retroreflector assembly of the present disclosure could be implemented is a side molding panel 108. Yet other example body components in which the retroreflector assembly of the present disclosure could be implemented are a rear bumper 112 and/or a trunk lid finisher 116 (e.g., a bottom portion of a trunk around a rear license plate or a decorative trim piece located near a middle or upper portion of the trunk). It will be appreciated, however, that the retroreflector assembly of the present disclosure could be implemented in any suitable body components (e.g., a front bumper).

The term "radar" as used herein comprises any suitable surveying method in a particular bandwidth assigned for passenger vehicles. Passenger vehicle radar and lidar systems, for example, utilize the 76-81 gigahertz (GHz) frequency band, which is very high compared to other systems. The high frequency signals being transmitted and reflected also require unique design solutions (e.g., very small retroreflector units), as discussed in greater detail herein.

Referring now to FIGS. 2A-2F and 3A-3D, various side cross-sectional views of example vehicle body components are illustrated. The designations "Front" and "Back" refer to the "A" and "B" surfaces of vehicle body components, respectively. All of the illustrated layers are also assembled (disposed, glued, chemically bonded, etc.) such that they collectively form a solid (non-hollow) body. FIGS. 2A-2F, for example, illustrate side cross-sectional views of various configurations for a vehicle body component comprising a signal reflecting retroreflector with the retroreflector geometry being uncovered. The conductive layer of the retroreflector may or may not be visible depending on whether one or more cover layers are clear or not.

Figure 2A:
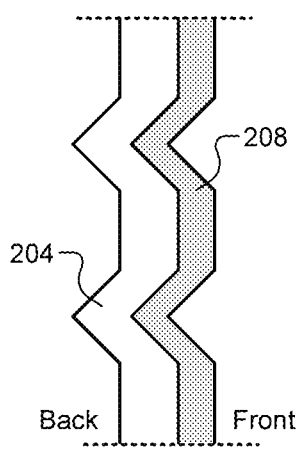
FIGS. 2A-2F depict side cross-sectional views of example configurations for vehicle body components comprising a signal reflecting retroreflector with the retroreflector geometry being uncovered according to some implementations of the present disclosure.
Figure 2B:
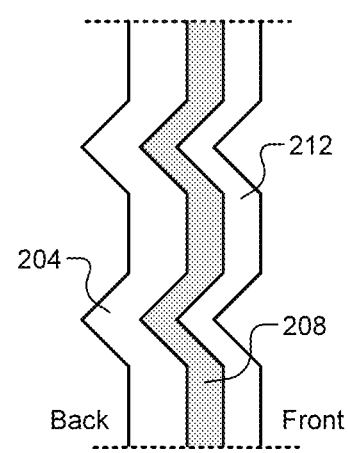

Referring now to FIGS. 2A-2B, side cross-sectional views of an example vehicle body component 200 are illustrated. These configurations of FIGS. 2A-2B are designed to operate as a corner retroreflector and each have a front side conductive surface. For example, the retroreflector geometry could be incorporated into an existing vehicle design element. In FIG. 2A, the body component 200 can include substrate 204 and top conductive layer 208 that forms the retroreflector assembly. The conductive layer 208 can be formed of any suitable electrical conductor (e.g., a metal), such as chrome plating, a film, or a paint. The substrate 204 can be formed of any suitable plastic or other dielectric material, such as acrylonitrile butadiene styrene (ABS), polycarbonate (PC), and PC-ABS. While ABS and ABS-PC are plateable resins, PC is not and thus ABS or ABS-PC may be utilized when chrome plating is to be applied.

The substrate 204 can be formed by injection molding, but other manufacturing methods could be used, such as, but not limited to, additive manufacturing, blow molding, metal forming/working, glass or metal casting, and a woven composite. The conductive layer 208 can be formed by chrome plating, but other manufacturing methods could be used, such as, but not limited to, vacuum film, adhesive film, metallic foil (e.g. hot stamping), paint, spray, physical vapor deposition (PVD), dip coating, and additive layering. The substrate 204 and the conductive layer 208 can collectively define a varying depth/geometry as shown. This geometry, for example, may be specifically designed such that the conductive layer 208 provides for maximum (e.g., focused) radar wave reflection (e.g., return signal power) in a particular direction. This geometry can additionally or alternatively be designed so as to increase the angular range from which a signal can reflect off a receiving vehicle and reflect back to the originating radar.

The collective thickness of the substrate 204, the conductive layer 208, and other optional layers discussed below can be relatively substantial, thus making larger vehicle body components ideal for a hidden implementation. The specific thicknesses and corner angles, however, may vary depending on particular design considerations (material permittivity, component/layer curvature, etc.). These thicknesses and other design considerations are discussed in greater detail below. In FIG. 2B, the body component 200 further comprises an optional top coat 212 applied over a conductive layer 208 (e.g., for appearance/aesthetics and/or protection). Non-limiting examples of methods for applying the top coat 212 include paint, spray, and a non-metal layer (e.g., a metalloid) applied via PVD, adhesive film, dip coating, and additive layering.

Figure 2C:
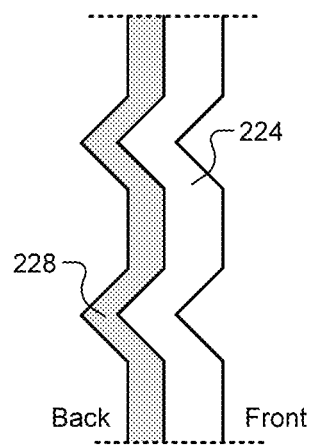
Figure 2D:
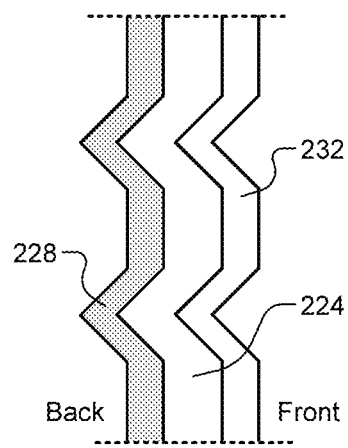

Referring now to FIGS. 2C-2D, side cross-sectional views of another example body component 220 are illustrated. These configurations are also designed to operate as a corner retroreflector, but each has a front side conductive surface. The substrate 224 is positioned on a front face of a back side conductive layer 228, and an optional top coat 232 may be applied to the substrate (see FIG. 2D). The same or similar types of materials and/or manufacturing methods discussed above with respect to component 200 and FIGS. 2A-2B can be utilized for the substrate 224, the conductive layer 228, and the optional top coat 232. For each of the configurations of FIGS. 2A-2D, one purpose of the substrate 204, 224 is to hold a shape or structure for the retroreflector (i.e., the conductive layer 208, 228 disposed thereon). As previously mentioned, the substrate 204 may or may not be radar transparent (e.g., the substrate 204 could be body sheet metal). In addition to ABS, PC, and ABS-PC, the substrate 204, 224 could be formed of other suitable dielectrics, such as acrylic-styrene-acrylonitrile (ASA), acrylonitrile ethylene styrene (AES), and nylon, as well as non-dielectrics such as glass, carbon fiber, and metal.

Figure 2E:
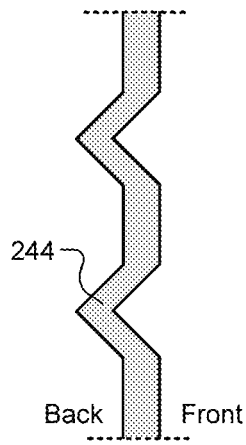
Figure 2F:
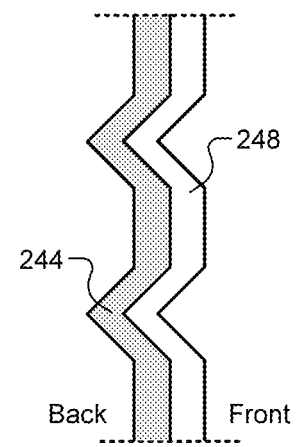

Referring now to FIGS. 2E-2F, side cross-sectional views of another example body component 240 are illustrated. These configurations are also designed to operate as a corner retroreflector, but each has a conductive layer 244 that is the substrate (i.e., there is no additional substrate layer). Thus, the conductive layer 244 may need to be thicker than in the configurations of FIGS. 2A-2D. The conductive layer 244 can optionally have a top coat 248 applied on its front surface (see FIG. 2F). The same or similar types of materials and/or manufacturing methods discussed above with respect to components 200, 220 and FIGS. 2A-2D can be utilized for the conductive layer 244 and the optional top coat 248. For example, the top coat 248 may be more important for protecting the conductive layer 244 of component 240 as there is no additional substrate for maintaining the retroreflector geometry.

FIGS. 3A-3D illustrate side cross-sectional views of various configurations for a vehicle body component comprising a passive retroreflector with the retroreflector geometry being covered. While the retroreflector geometry is covered (i.e., a smooth outer surface), the retroreflector geometry may still be visible depending on whether one or more cover layers are clear or not.

Figure 3A:
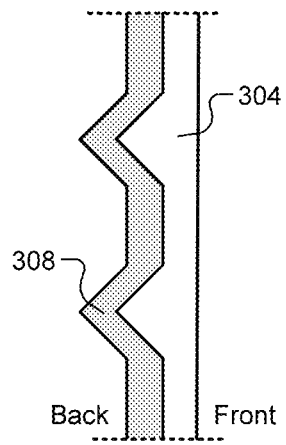
FIGS. 3A-3D depict side cross-sectional views of example configurations for vehicle body components comprising a passive retroreflector with the retroreflector geometry being covered according to some implementations of the present disclosure.
Figure 3B:
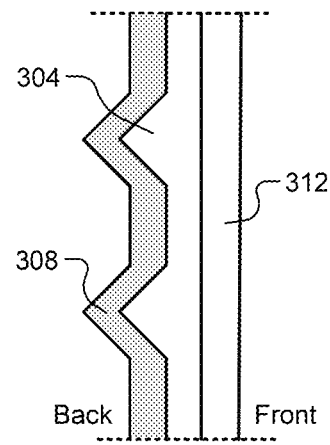

Referring now to FIGS. 3A-3B, side cross-sectional views of an example vehicle body component 300 are illustrated. These configurations are designed to operate as a corner retroreflector and each have a back side conductive surface. In FIG. 3A, a substrate 304 defines a smooth front surface and the retroreflector geometry is defined by its back surface. A conductive layer 308 is then disposed on the back surface of the substrate 304. While described as smooth, the front surface of the substrate 304 could be flat or curved (e.g., see FIG. 5A). For example, the curvature of each layer (e.g., conductive layer 308) can correspond to a curvature of the body component 300 as a whole (e.g., either the same curvature or a similar curvature). The substrate 304 can also be opaque or clear. In FIG. 3B, the component 300 has an optional top coat 312 applied to the front surface of the substrate 304. The same or similar types of materials and/or manufacturing methods discussed above with respect to components 200, 220, and 240 and FIGS. 2A-2F can be utilized for the substrate 304, the conductive layer 308, and the optional top coat 312.

Figure 3C:
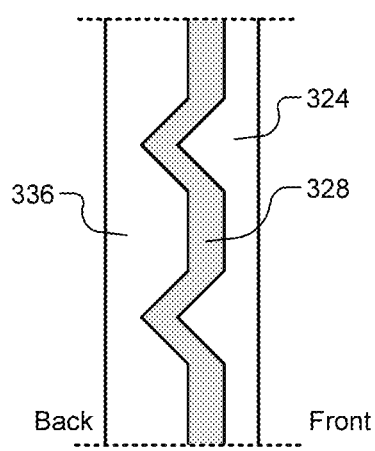
Figure 3D:
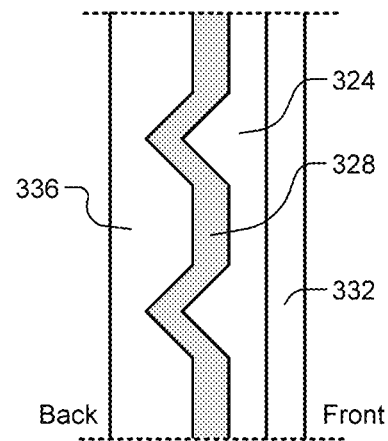

Referring now to FIGS. 3C-3D, side cross-sectional views of an example vehicle body component 320 are illustrated. These configurations are designed to operate as a corner retroreflector and each have a back side conductive surface. In FIG. 3C, a first substrate 324 defines a smooth front surface and the retroreflector geometry is defined by its back surface. A conductive layer 328 is disposed on, attached to, or adjacent to the back surface of the first substrate 324. While described as smooth, the front surface of the first substrate 324 could be flat or curved. The first substrate 324 can also be either opaque or clear. In FIG. 3D, the component 320 has an optional top coat 332 applied to the front surface of the first substrate 324. The same or similar types of materials and/or manufacturing methods discussed above with respect to components 200, 220, 240, and 300 and FIGS. 2A-2F and 3A-3B can be utilized for the first substrate 324, the conductive layer 328, and the optional top coat 332.

The configurations of FIGS. 3C-3D, however, can further comprise a second substrate 336 disposed on a back side of the conductive layer 328. The second substrate 336 can be formed of the same materials and/or the same manufacturing methods as the other substrates discussed herein (e.g., plastic or body sheet metal). The front surface of the second substrate 336 defines the retroreflector geometry along with the conductive layer 328 and the back side of the first substrate 324. A back surface of the second substrate 336 can be smooth like a front surface of the first substrate 324 (flat, curved, etc.). The second substrate 336 may provide for improved structural rigidity compared to other configurations. The first and second substrates 324, 336 could be formed as part of a multi-shot injection molding process. However, it will be appreciated that these components could be separately formed and then assembled together. The second substrate and/or top coat can be collectively referred to as a cover layer, which could comprise either or both of the second substrate and the top coat.

Figure 4A:
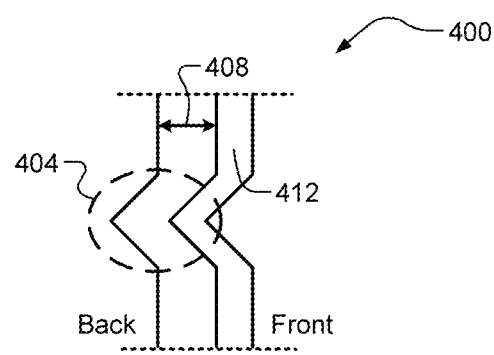
FIGS. 4A-4F depict example configurations for the retroreflector geometry according to some implementations of the present disclosure.
Figure 4B:
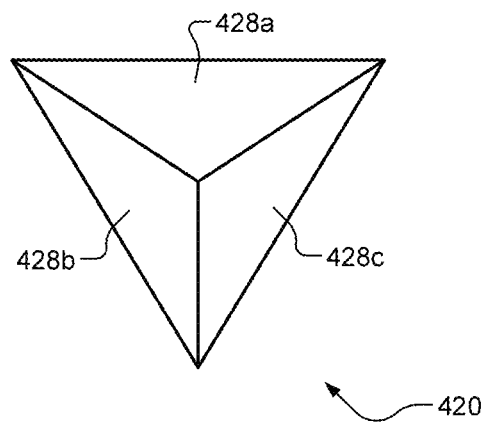
Figure 4C:
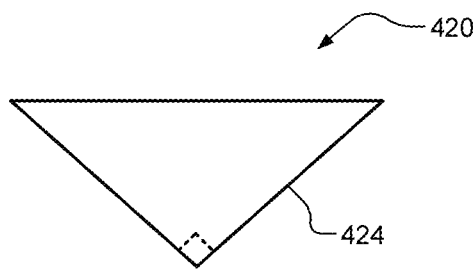
Figure 4D:
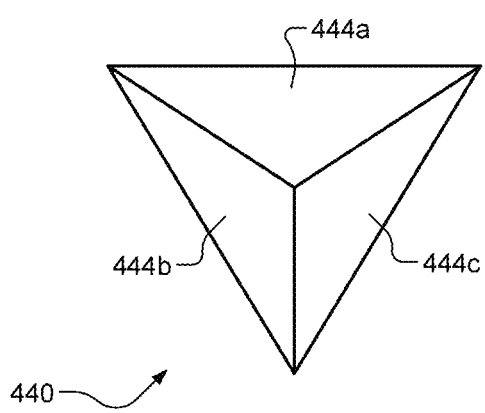
Figure 4E:
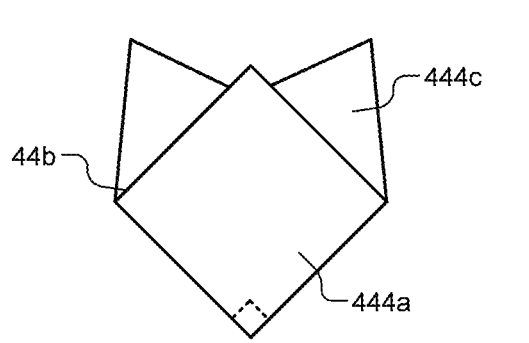
Figure 4F:
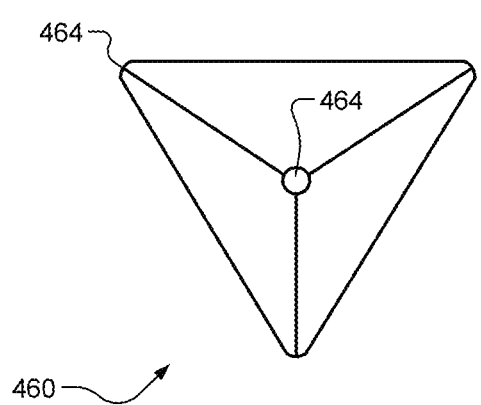

Referring now to FIGS. 4A-4F, example configurations for the retroreflector geometry are illustrated. For a corner retroreflector 400 as shown in FIG. 4A, the following parameters can be optimized for a particular vehicle application: the retroreflector geometry 404 (e.g., angle/slope of corner), the front facing thickness 408, the front coating thickness 412, and distance between units (if there is more than one retroreflector—see, e.g., the vertical distance between retroreflector units in FIGS. 2A-2F and 3A-3D). By optimizing these parameters, signal reflection is enhanced. FIGS. 4B-4C illustrate top and side views of a trihedral retroreflector 420, which is one type of corner retroreflector. A length of the side 424 may be designed to be greater than a wavelength of the radar waves. The faces 428a, 428b, 428c may intersect at an angle of approximately 90 degrees with respect to each other. This angle, however, may differ from 90 degrees such that it is optimized to maintain retroreflective properties, e.g., with materials that have a refractive index greater than one. FIGS. 4D-4E illustrate top and side views of a square retroreflector 440, which is another type or corner retroreflector. In some implementations, edges 464 of each retroreflector unit 460 (see FIG. 4F) can be rounded to at least one of (i) prevent radar signal scattering and (ii) prevent strong peaks in signal interference.

While single unit retroreflector examples are illustrated in FIGS. 4A-4F and described above, it will be appreciated that the components previously discussed herein may define an array geometry for their retroreflectors. Array geometry retroreflectors refer to arrays comprising at least one retroreflector unit but up to as many as desired. As previously mentioned, spacing or distance between each retroreflector unit is one design consideration that can be optimized, e.g., to increase angular range or to create a phase agreement (e.g. a positive interference). For example, each of the example components of FIGS. 2A-2F and 3A-3D illustrate retroreflector geometries comprising arrays of two retroreflector units each. In addition, while only certain layer configurations are shown in these FIGS. and discussed herein, it will be appreciated that there could be additional layers that are not illustrated, e.g., for decorative purposes.

Figure 5A:
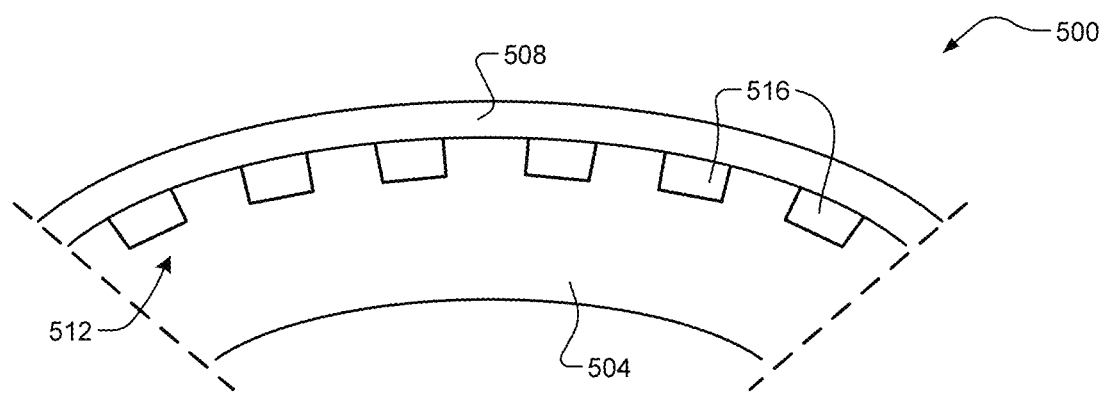
FIGS. 5A-5B depict side and overhead cross-sectional views of an example configuration for vehicle body components comprising an antenna retroreflector according to some implementations of the present disclosure.
Figure 5B:
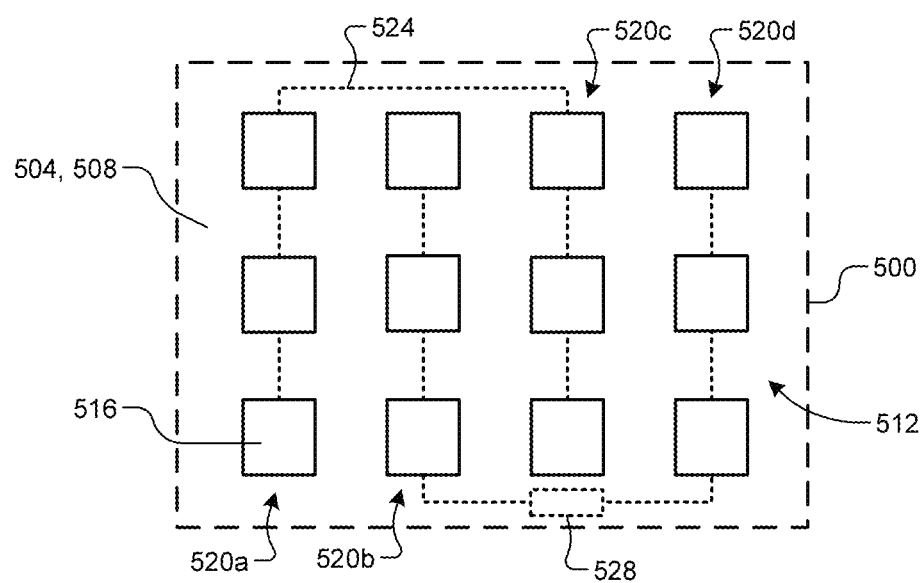

Referring now to FIGS. 5A-5B, side and overhead cross-sectional views of another example vehicle body component 500 are illustrated. This configuration is designed to operate as an antenna retroreflector. The body component 500 can include a substrate 504, an optional top coat 508, and a retroreflector assembly 512 comprising a plurality of retroreflector units 516 disposed therebetween. As shown, the retroreflective assembly 512 is a discrete array (see overhead view FIG. 5B) that is disposed on or in a front/top surface of the substrate 504. Each portion of the retroreflective unit 516 is formed of a reflective material (e.g., a metal) that is applied (e.g., printed) onto the substrate 504. While printing is described herein, it will be appreciated that other techniques could be utilized, such as applying a film having the retroreflective assembly 512 disposed or printed thereon. The same type or types of materials and/or manufacturing methods described above with respect to the other body components (e.g., FIGS. 2A-2F and 3A-3D) can be utilized to form the substrate 504 and the top coat 508.

As shown in FIG. 5B, the retroreflective units 516 can be interconnected (e.g., via wire traces 524) in various manners to achieve various functionality. The illustrated connection configuration is also known as a patch or patchwork configuration. This type of configuration will typically have at least four retroreflective units 516 or "patches" of retroreflective material, and additional ones can be added in even pairs. As show, columns/rows 520*a* and 520*c* of retroreflective units 516 are interconnected in series and columns/rows 520*b* and 520*d* of retroreflective units 516 are interconnected in series. Note that these groups 520*a*/520*c* and 520*b*/520*c* are of even length (e.g., each comprising 8 retroreflective units 516). Alternatively, other lengths could be implemented to cause a phase shift of the received radar waves (e.g., in integer multiples of its wavelength). The antenna arrays can be made longer or shorter, for example, to change the reflected signal distribution in space. Similarly, for example, the antenna arrays can be oriented vertically or horizontally to change the reflected signal distribution. In one exemplary implementation, the retroreflector array is configured as a Van Atta array.

While the above example is a signal reflecting antenna retroreflector configuration, an antenna retroreflector configuration can also be configured such that it causes signal modulation. Some of the example functionality that can be achieved includes: phase shifting, polarization shifting, and creating a unique identifier via modulation of one or more of phase, polarization, frequency, and amplitude of the reflected signal. Non-limiting techniques for achieving this various functionality for a signal modulating antenna retroreflector include: patch and antenna wire lengths, patch and antenna design (number of patches, number of arrays, etc.), wire trace design, oscillators along the wire traces 524, filters along the wire traces 524, amplifiers along the wire traces 524, patterns of the wire traces 524. These can each be referred to as a modulation device 528. In some implementations, when implementing modulation devices 528, small circuits can be added (e.g., printed). Non-limiting examples of the manufacturing methods for these components include printed electronics, film, and in-mold electronics.

Figure 6:
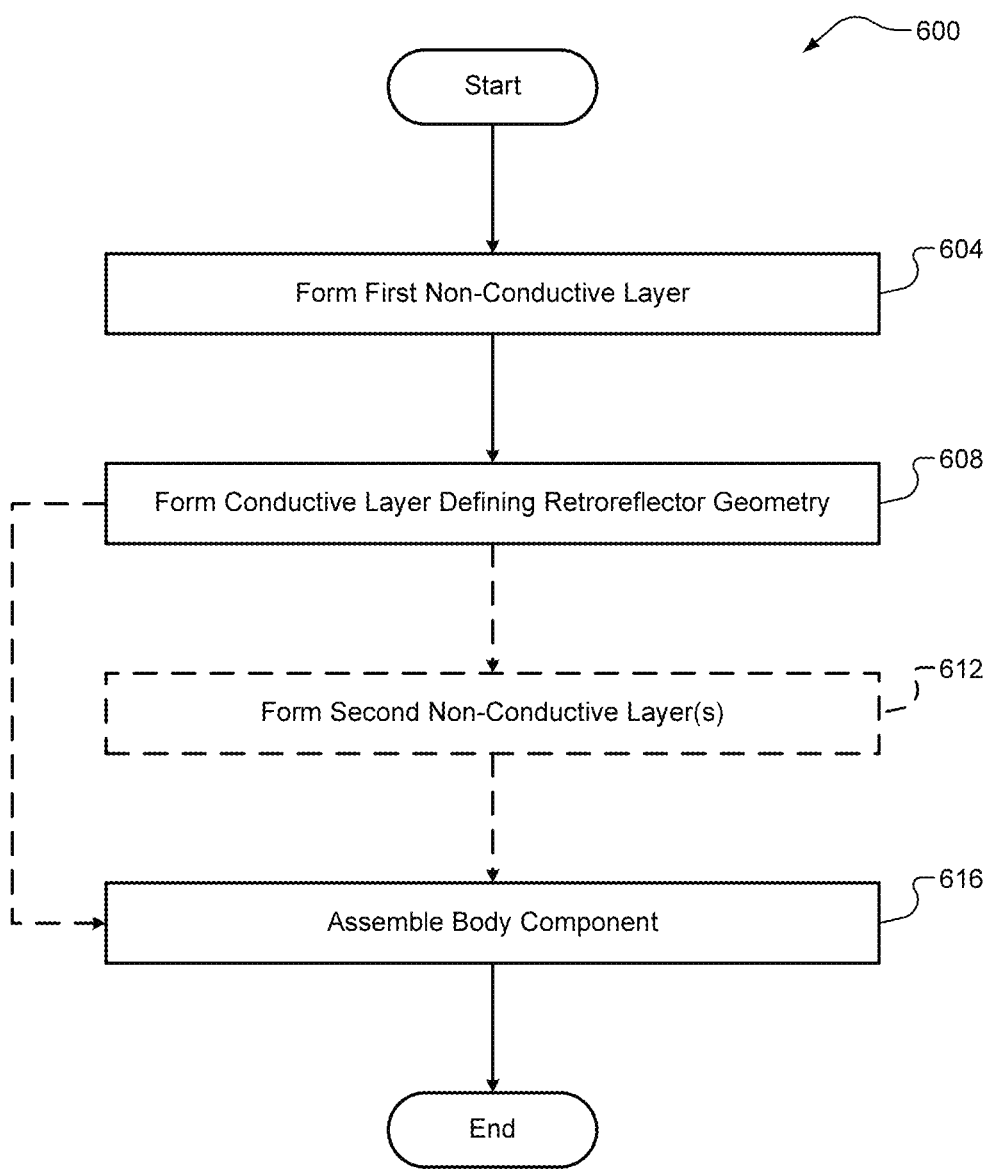
FIG. 6 depicts a flow diagram of an example method of manufacturing a vehicle body component comprising a retroreflector according to some implementations of the present disclosure.

Referring now to FIG. 6, a flow diagram of an example method 600 of manufacturing a vehicle body component comprising a retroreflector is illustrated. It will be appreciated that any suitable combination of the manufacturing methods previously discussed herein can be utilized for the various steps of method 600. At 604, a first non-conductive layer is formed, e.g., by injection molding (a first substrate, a top coat, etc.). At 608, a conductive layer is formed, e.g., by chrome plating, to define the retroreflector geometry. In some implementations, the retroreflector geometry could already be defined by the non-conductive layer. At optional 612, one or more second non-conductive layers are formed, e.g., by injection molding, (a second substrate, the top coat, etc.). In some implementations, a multi-shot injection molding process can be utilized when one or more injection molding steps or shots are performed. At 616, the body component comprising the retroreflector is assembled. In some cases, multiple pieces are combined or joined together. In other cases, the body component is already fully formed after steps 604-608 (and optional 612) and can be removed from a mold to obtain the final body component. The method 600 can then end or return to 604 for one or more additional cycles.

It will be appreciated that the vehicle body components comprising retroreflectors as described herein can be utilized by a vehicle radar-based object detection system. For example, another vehicle can have a controller (e.g., an engine control unit, or ECU) and a radar device (e.g., a radar transceiver) (not shown herein) that collectively perform object detection or another other related technique, such as adaptive cruise control. In this example, the radar device emits radar waves in a specific direction (e.g., in response to a signal from the controller) and then captures reflected radar waves that are reflected by the vehicle body component comprising the retroreflector. The controller then processes data corresponding to the captured reflected radar waves as part of the object detection or other related technique. The retroreflector in the vehicle body component provides for better reflection of the radar waves, which in turn enhances the performance of the object detection system. In addition, these retroreflectors may produce a specific signature or unique identifier in a reflected radar wave that could act as a vehicle identification tag for helping the controller distinguish between vehicles and other objects. Even further, signal modulating retroreflective arrays could be utilized for communicating other information between vehicles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

According to other aspects of the present disclosure, various multi-piece retroreflector systems are presented.

These systems are referred to as "multi-piece" systems because they are formed by attaching a separate retroreflector piece to a B-side of a vehicle body component. Any suitable means of attachment could be utilized, including but not limited to, clips, dog-houses plus fitments, adhesive tape, other adhesives, and sonic welding. The retroreflector portion of the multi-piece retroreflector system could comprise a plurality of distinct or free retroreflectors, a plurality of strips of retroreflectors, or a solid piece comprising a plurality of retroreflectors. By utilizing this type of multi-piece design, the retroreflector system are also able to be formed on curved surfaces as well as flat surfaces. This is particularly useful, for example, for implementation on a corner body component of a vehicle.

Figure 7:
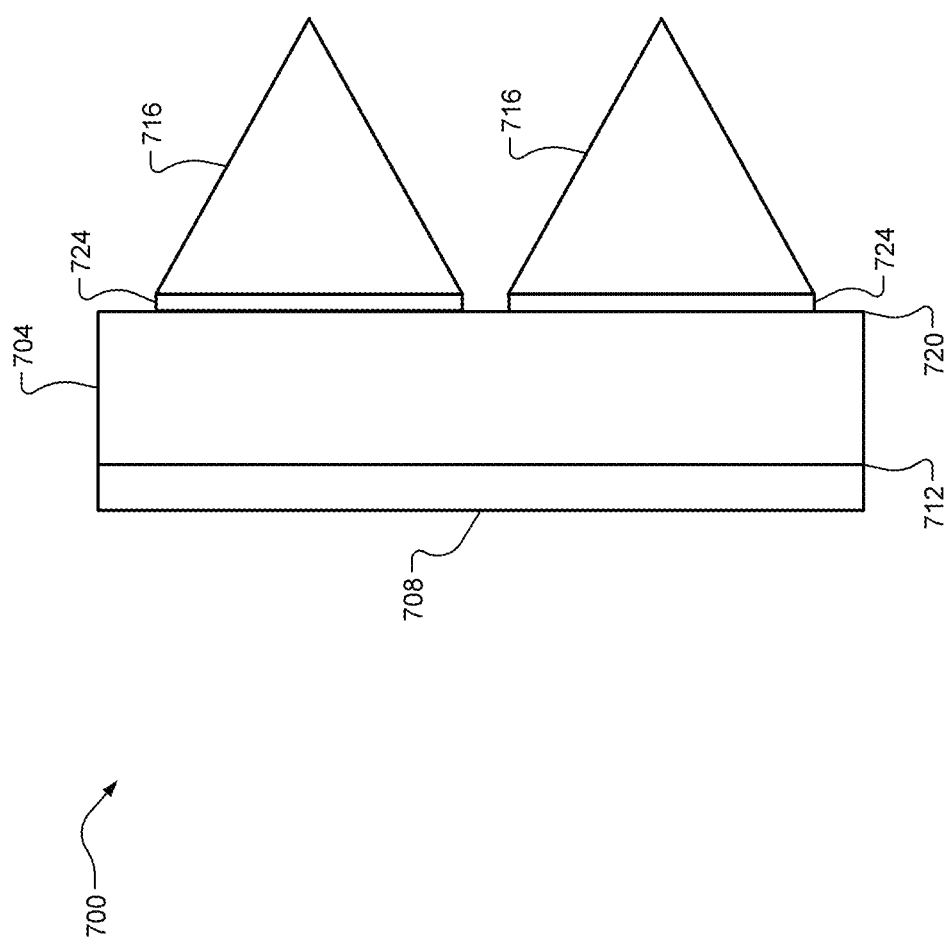
FIG. 7 depicts an example multi-piece retroreflector system for a vehicle according to some implementations of the present disclosure.

Referring now to FIG. 7, an example multi-piece retroreflector system 700 is illustrated. The system comprises a vehicle body component 704 with an optional radar-transparent coating 708 on an A-side 712 of the component 704. One or more separate retroreflector pieces 716 are attached to a B-side 720 of the component 704. This attachment is via one or more attachment devices 724. Non-limiting examples of the attachment device(s) 724 include (i) clips, (ii) a dog-houses plus a fitment, (iii) adhesive tape, (iv) non-tape adhesive, (v) sonic welding, and combinations thereof. As shown, the retroreflector pieces 716 are corner retroreflectors, but it will be appreciated that other retroreflector configurations could be utilized. The component 704 is formed of a dielectric material. Potential materials for construction of the component 704 include, but are not limited to, automotive exterior plastics such as PC, PC-ABS, ABS, and thermoplastic olefin (TPO), ceramic or composite (e.g., carbon), and glass. Each of these materials could also have the optional radar-transparent coating 708 as illustrated. Potential materials for construction of the retroreflector include, but are not limited to, a formed metal (e.g., a stamped metal), a dielectric material such as PC, PC-ABS, ABS, and TPO with the addition of a radar-reflective coating (e.g., chrome plating), and a ceramic or composite (e.g., carbon) with the addition of a radar-reflective coating. It will be appreciated that the retroreflector(s) could also be formed of a plastic material without a radar-reflective coating, such as a plastic with an integrated conductive mineral to make the plastic conductive. Each retroreflector piece 716 can also be either hollow or filled. If filled, the inner or filler material should be a radar-transparent material with a low dielectric value.

Referring now to FIGS. 8A-8D, example configurations for the retroreflector piece(s) 716 are illustrated. FIG. 8A illustrates an example corner retroreflector array 800 comprising 25 individual corner retroreflector pieces 804. In this example configuration, a distance 808 between the center of each retroreflector piece is approximately 47 millimeters (mm) and a width/height 812 of the array 800 is approximately 270 mm. FIG. 8B illustrates a plot 820 of example performance of the array 800 (line 824) compared to a vehicle body component without a retroreflector system (line 828), such as a flat plate. As can be seen, the array 800 provides for a large performance improvement at up to a 45 degree observation angle. FIGS. 8C and 8D illustrate alternative configurations. In FIG. 8C, another example corner retroreflector array 840 comprises 9 individual corner retroreflector pieces 844. In this example configuration, an edge length 848 of each corner retroreflector piece 844 is approximately 58 mm, a distance 852 between the center of each corner retroreflector piece 844 is approximately 69 mm, and a width/height 856 of the array 840 is approximately 196 mm. In FIG. 8D, a single unit configuration 880 comprises a single corner retroreflector 884 having a side length of approximately 100 mm.

Figure 9A:
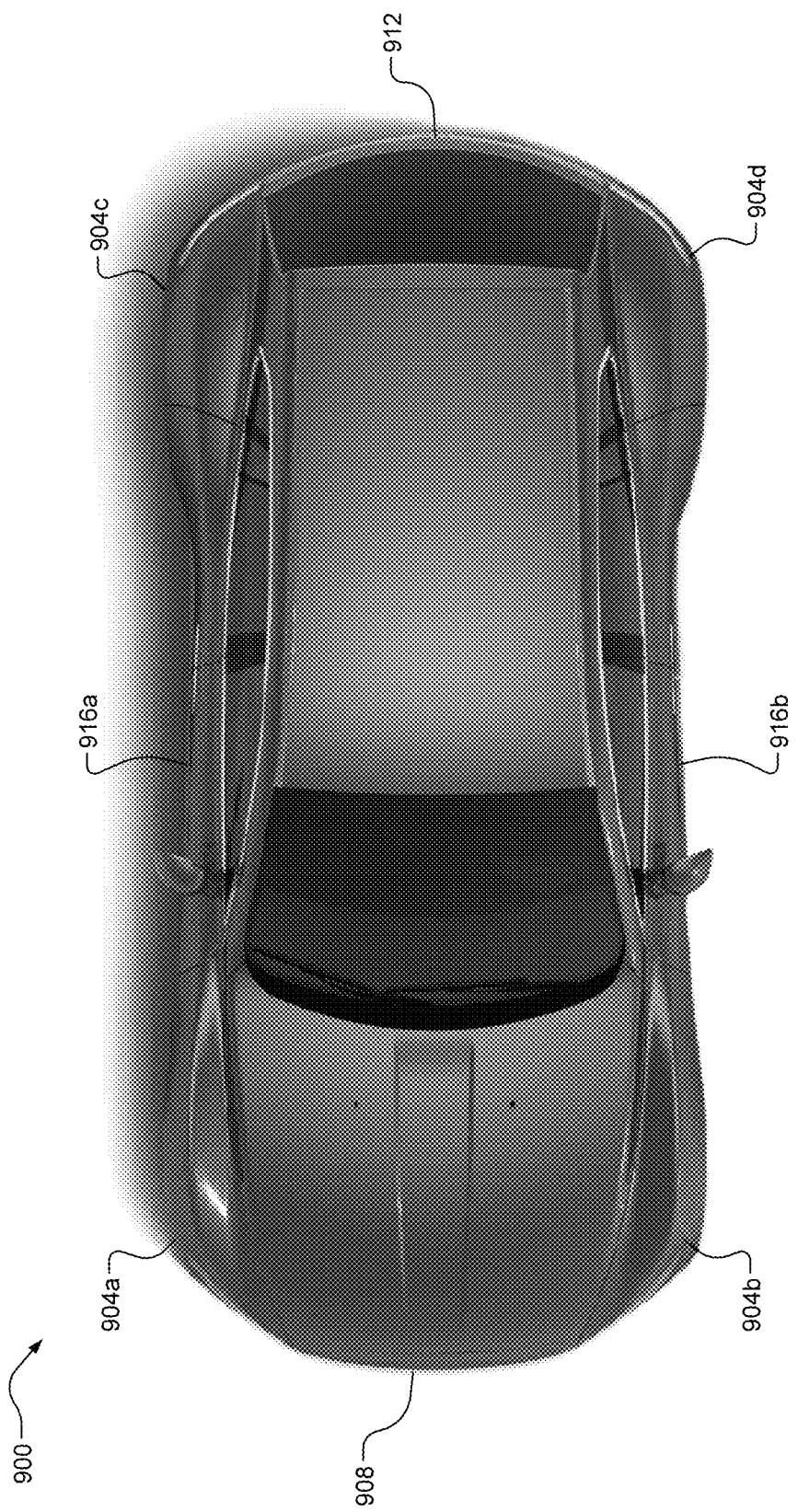
FIGS. 9A-9B depict example locations on a vehicle for implementing retroreflector systems and a plot of example retroreflector performance according to some implementations of the present disclosure.
Figure 9B:
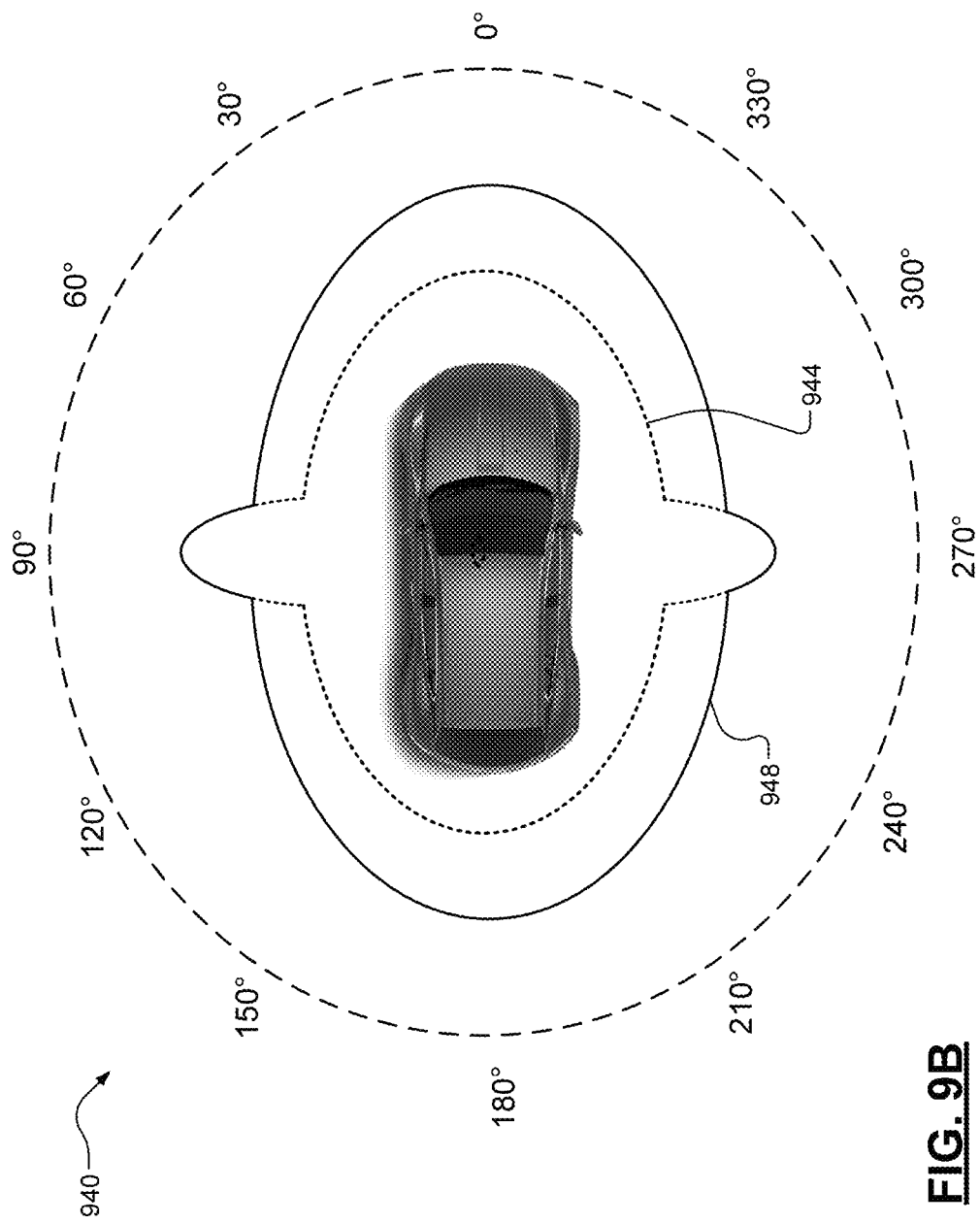

According to other aspects of the present disclosure, various configurations of retroreflector systems on a vehicle for reflection management and patterning are presented. FIG. 9A illustrates example locations for enhancing the detectability of a vehicle 900 by other vehicle radar systems. Implementing retroreflector systems in corner body components 904a, 904b, 904c, 904d (e.g., corners of front/rear bumpers) as can be seen in the plot 940 of FIG. 9B. Field 944 illustrates the reflectance of a vehicle without retroreflector systems, compared to field 948 which illustrates the reflectance performance of a vehicle (e.g., in dB) with at least four corner body component implemented retroreflector systems. Implementing retroreflector systems in other body components, such as central portions of a front end 908 (e.g., in a central portion of a front bumper or a grille assembly), a rear end 912 (e.g., a central portion of a rear bumper, a taillight, or a trunk finisher), and side portions 916a, 916b (e.g., side moldings) can further enhance the detectability of the vehicle 900 by other vehicle radar systems.

Figure 10:
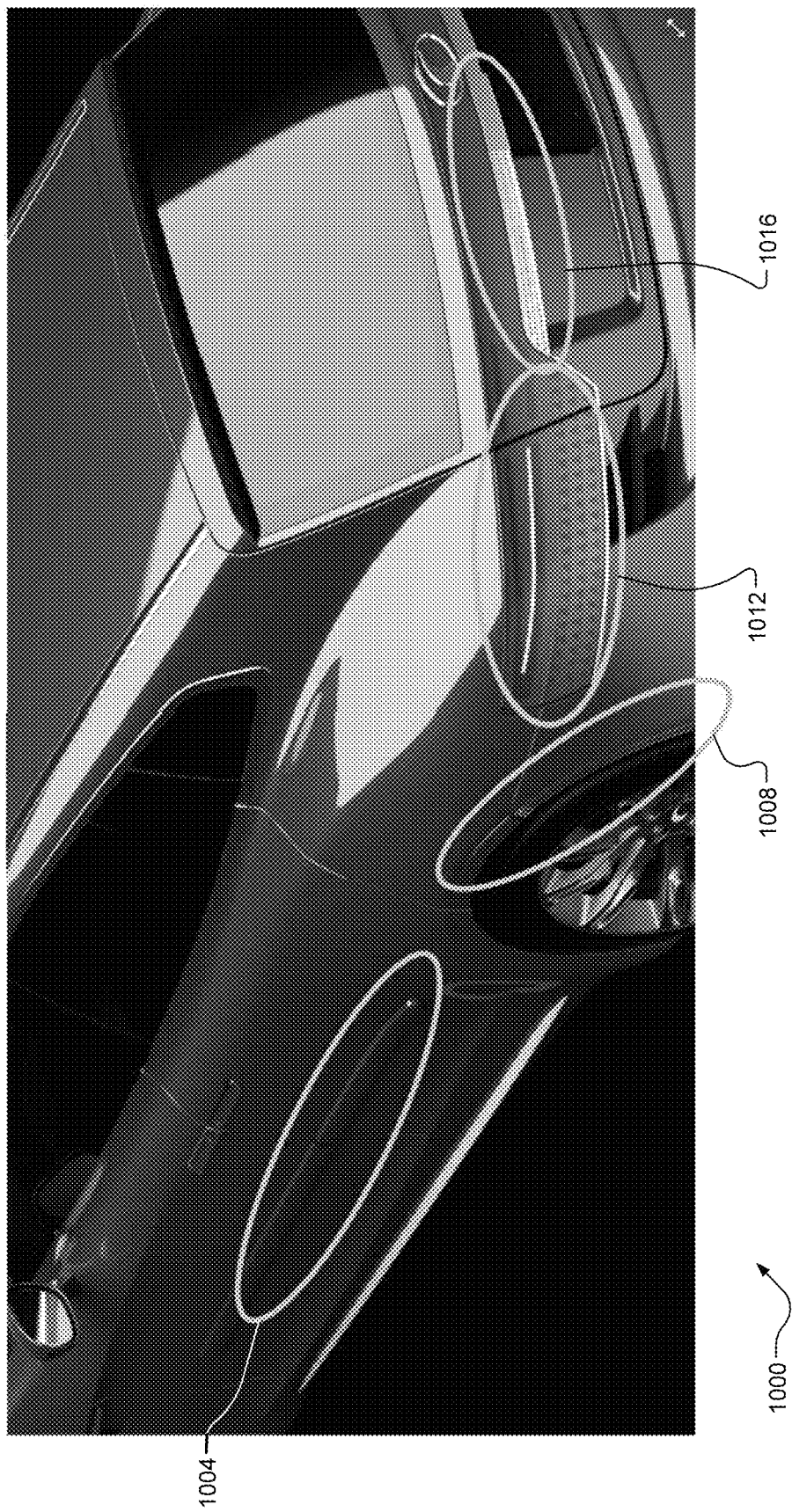
FIG. 10 depicts example implementations of retroreflector systems on a vehicle according to some implementations of the present disclosure.

According to other aspects of the present disclosure, manufacturing techniques for hiding retroreflectors on a vehicle are presented. As discussed above, retroreflectors can be attached to a B-side of a body component of a vehicle, which thereby hides the retroreflectors from view. FIG. 10 illustrates some example locations where retroreflector systems could be hidden on a vehicle 1000. These include, but are not limited to, a painted side body molding (1004), a painted wheel trim (1008), a mold-in-color (MiC) tail lamp accent (1012), and a chrome-like trunk lid finisher (1016). It will be appreciated that these example implementations are merely examples and that the retroreflector systems could be implemented in any suitable component. Alternatively, flat or planar retroreflectors (i.e., not corner retroreflectors) could be hidden on an A-side of the body component and then hidden behind a radar-transparent coating such as a paint or a post-transition metal or metalloid applied via physical vapor deposition (PVD) or a film. Non-limiting examples of these flat/planar retroreflectors include Van Atta arrays and frequency selected surfaces (FSS). In use, the reflected signal strength can be utilized to determine object presence, time to receipt of the reflected signal can be utilized to determine how far away the object is, and the pattern of the reflected signal can be utilized to determine a type of the object. Thus, by designing the retroreflector systems to generate specific reflective patterns, the type of object can be determined by the transmitting vehicle.

What is claimed is:

1. A body component of a vehicle, the body component comprising:
   a rigid substrate formed of a dielectric and defining inner and outer surfaces;
   a radar-transparent layer arranged above the outer surface of the rigid substrate; and
   an antenna array retroreflector comprising a plurality of distinct and discontinuous conductive elements spatially separated from each other and arranged between the radar-transparent layer and the outer surface of the rigid substrate.

2. The body component of claim 1, further comprising an electrical connection from the antenna array retroreflector to the inner surface of the rigid substrate.

3. The body component of claim 1, wherein the plurality of distinct and discontinuous conductive elements are formed by applying a metal onto the radar-transparent layer.

4. The body component of claim 3, wherein the metal is one of a chrome plating, a conductive spray-on paint, a conductive printed ink, a conductive coating applied via physical vapor deposition (PVD), and a stamped metal plus an adhesive.

5. The body component of claim 1, further comprising an adhesive applied between the antenna array retroreflector and the outer surface of the rigid substrate.

6. The body component of claim 2, wherein the electrical connection is a blade connector system that electrically connects the antenna array retroreflector to a ground plane at the inner surface of the rigid substrate via a channel through the rigid substrate or around an outer edge of the rigid substrate.

7. The body component of claim 1, wherein the dielectric comprises at least one of polycarbonate (PC), acrylonitrile butadiene styrene (ABS), thermoplastic olefin (TPO), polymethyl methacrylate (PMMA), and acrylonitrile styrene acrylate (ASA).

8. The body component of claim 1, wherein the body component is one of a bumper, a side body molding or wheel trim, a grille, a pillar, a tail lamp, and a trunk lid.

9. The body component of claim 1, wherein the body component is formed using a roll-to-roll process.

10. A body component of a vehicle, the body component comprising:
a rigid substrate formed of a radar-transparent plastic and defining inner and outer surfaces, wherein the inner surface of the rigid substate corresponds to an inner surface of the body component, and wherein the outer surface of the rigid substrate faces an environment surrounding the vehicle; and
a plurality of retroreflectors applied to the inner surface of the rigid substrate, wherein each retroreflector of the plurality of retroreflectors is formed of a metal and has a corner retroreflector configuration.

11. The body component of claim 10, wherein the plurality of retroreflectors are each formed by separately stamping pieces of the metal and then separately attaching each stamped metal piece to the inner surface of the rigid substrate.

12. The body component of claim 10, wherein the plurality of retroreflectors are each formed by separately forming plastic pieces, separately coating each plastic piece with the metal, and then attaching each metal-coated plastic piece to the inner surface of the rigid substrate.

13. The body component of claim 10, wherein the plurality of retroreflectors are collectively formed by stamping a single piece of the metal and attaching the single stamped metal piece to the inner surface of the rigid substrate.

14. The body component of claim 10, wherein the plurality of retroreflectors are collectively formed by forming a single plastic piece, coating the single plastic piece with the metal, and attaching the single metal-coated plastic piece to the inner surface of the rigid substrate.

15. The body component of claim 10, wherein the plurality of retroreflectors are formed by applying the metal to the inner surface of the rigid substrate.

16. The body component of claim 10, wherein the rigid substrate is formed during one shot of a multi-shot injection molding process, wherein the plurality of retroreflectors are formed during another shot of the multi-shot injection molding process, and wherein the plurality of retroreflectors are selectively chrome plated after the multi-shot injection molding process.

17. The body component of claim 10, wherein the radar-transparent plastic comprises at least one of polycarbonate (PC), acrylonitrile butadiene styrene (ABS), thermoplastic olefin (TPO), polymethyl methacrylate (PMMA), and acrylonitrile styrene acrylate (ASA).

18. The body component of claim 10, wherein the body component is one of a painted side body molding, a painted wheel trim, a mold-in-color (MiC) tail lamp accent, and a trunk lid finisher.

19. The body component of claim 18, wherein the corner retroreflector configuration defines a rectangular or square shape having four sides each with a respective length, wherein for the painted side body molding and the trunk lid finisher, each length is approximately 8 millimeters, and wherein for the painted wheel trim and the MiC tail lamp accent, each length is approximately 19 millimeters.

20. The body component of claim 10, wherein the body component is formed by a mold-pour process.

* * * * *